(12) United States Patent
Krzanowski

(10) Patent No.: US 8,345,568 B2
(45) Date of Patent: Jan. 1, 2013

(54) LOW LOSS LAYER TWO ETHERNET NETWORK

(75) Inventor: Roman Krzanowski, White Plains, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 474 days.

(21) Appl. No.: 12/607,119

(22) Filed: Oct. 28, 2009

(65) Prior Publication Data

US 2011/0096676 A1   Apr. 28, 2011

(51) Int. Cl.
*H04J 1/16* (2006.01)
*H04L 12/28* (2006.01)

(52) U.S. Cl. ..................... 370/252; 370/409
(58) Field of Classification Search ............... None
See application file for complete search history.

(56) References Cited

U.S. PATENT DOCUMENTS

| | | | | |
|---|---|---|---|---|
| 5,732,085 A * | 3/1998 | Kim et al. | | 370/398 |
| 6,836,466 B1 * | 12/2004 | Kant et al. | | 370/252 |
| 2002/0015387 A1 * | 2/2002 | Houh | | 370/250 |
| 2007/0130325 A1 * | 6/2007 | Lesser | | 709/224 |
| 2007/0230496 A1 * | 10/2007 | Guo et al. | | 370/432 |
| 2008/0013550 A1 * | 1/2008 | Yamauchi | | 370/400 |
| 2009/0161569 A1 * | 6/2009 | Corlett | | 370/252 |
| 2010/0097931 A1 * | 4/2010 | Mustafa | | 370/235 |
| 2010/0165991 A1 * | 7/2010 | Veal et al. | | 370/392 |
| 2011/0090789 A1 * | 4/2011 | Fung | | 370/230 |
| 2011/0249572 A1 * | 10/2011 | Singhal et al. | | 370/252 |
| 2011/0310909 A1 * | 12/2011 | Memon et al. | | 370/412 |

* cited by examiner

*Primary Examiner* — Andrew Lee

(57) ABSTRACT

A method may include provisioning a first virtual connection between a first device and a second device, and provisioning a second virtual connection between the first device and the second device. A data flow is received and duplicated at the first device to generate duplicated data flows. The duplicated data flows are transmitted to the second device via the first virtual connection and the second virtual connection. The duplicated data flows are received at the second device via the first virtual connection and the second virtual connection. A performance characteristic of the data flow received via the first virtual connection is determined. The performance characteristic of the data flow received via the second virtual connection is determined. The data flow received via the first virtual connection or the data flow received via the second virtual connection is selected for forwarding based on the performance characteristics of the data flow received via the first virtual connection and the performance characteristic of the data flow received via the second virtual connection. The selected data flow is forwarded.

20 Claims, 4 Drawing Sheets

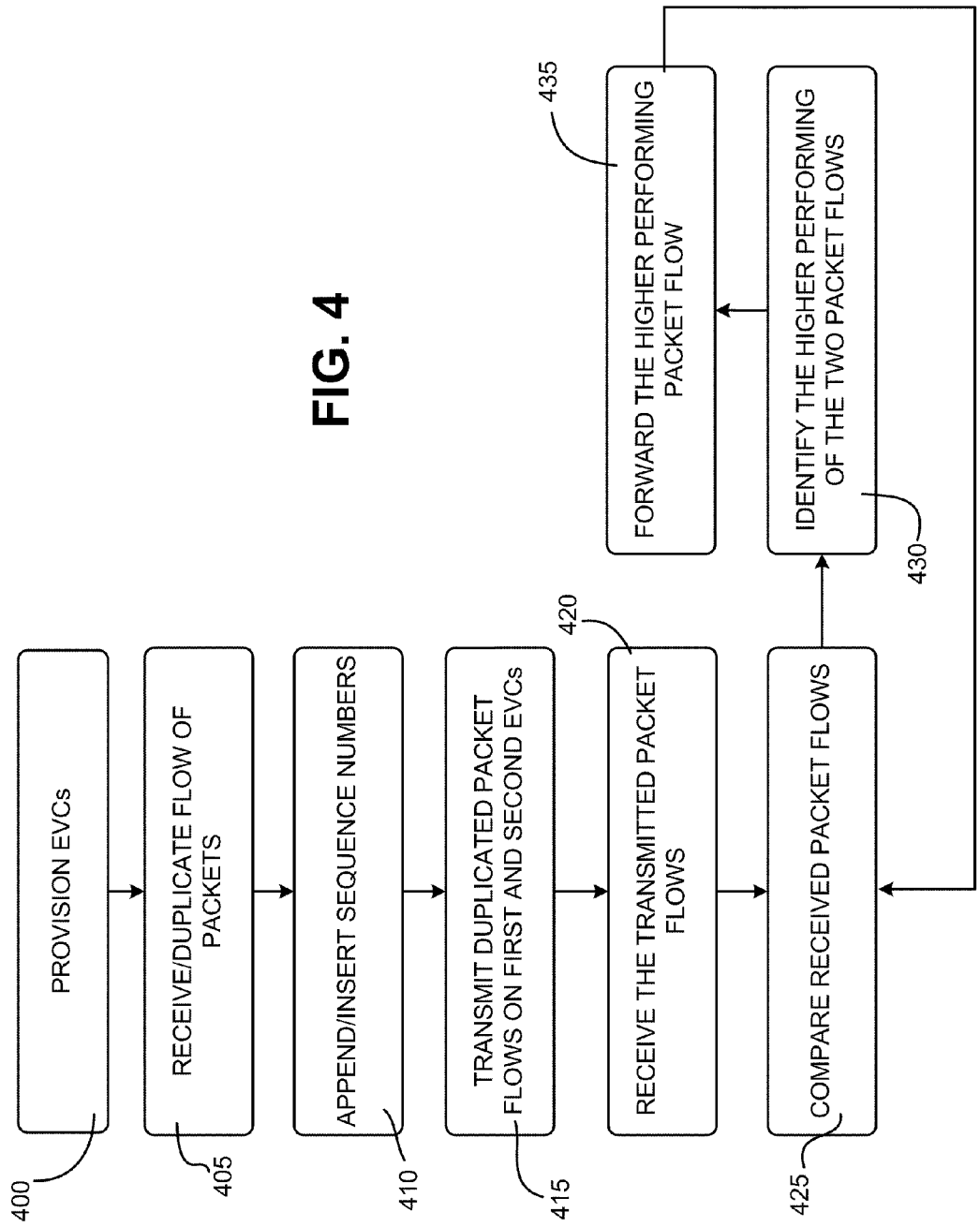

LOW LOSS LAYER TWO ETHERNET NETWORK

BACKGROUND INFORMATION

Traditional carrier networks rely on a variety of Layer 2 transport mechanisms to transmit data through the network. Typical carrier-level transport mechanisms include asynchronous transfer mode (ATM), synchronous optical network (SONET), frame relay, etc. Increasing demands for carrier networks that support scalable infrastructures, such as mobile back haul transmission systems, Internet Protocol television (IPTV), multi-service broadband offerings (e.g., offerings of voice, video, and data), private networks, etc., have led service providers to consider alternative, more cost-effective and scalable solutions.

Carrier Ethernet networks have been developed to leverage Ethernet technology to service provider networks. Carrier Ethernet networks include Ethernet virtual connections (EVCs) established between endpoints on the network.

BRIEF DESCRIPTION OF THE DRAWINGS

FIG. 4 is a flowchart of exemplary processes associated with the network portion of FIG. 3.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and methods described herein may provide Ethernet carrier network connections having improved performance characteristics. In one implementation, first and second Ethernet virtual connections may be configured between a near end network device and a far end network device. A packet flow may be duplicated at the near end network device and transmitted to the far end network device via both the first and second Ethernet virtual connections. The far end network device may receive the packet flows from the first and second Ethernet virtual connections and may determine which of the two flows exhibits better performance when compared to the other of the two flows. The far end network device may forward the packet flow that exhibits the better performance. By continually monitoring the duplicated packet flows for performance characteristics, the far end network device may quickly and efficiently switch to the flow having the better performance (e.g., fewer errors, etc.), thereby resulting in improved network performance.

Figure 1:
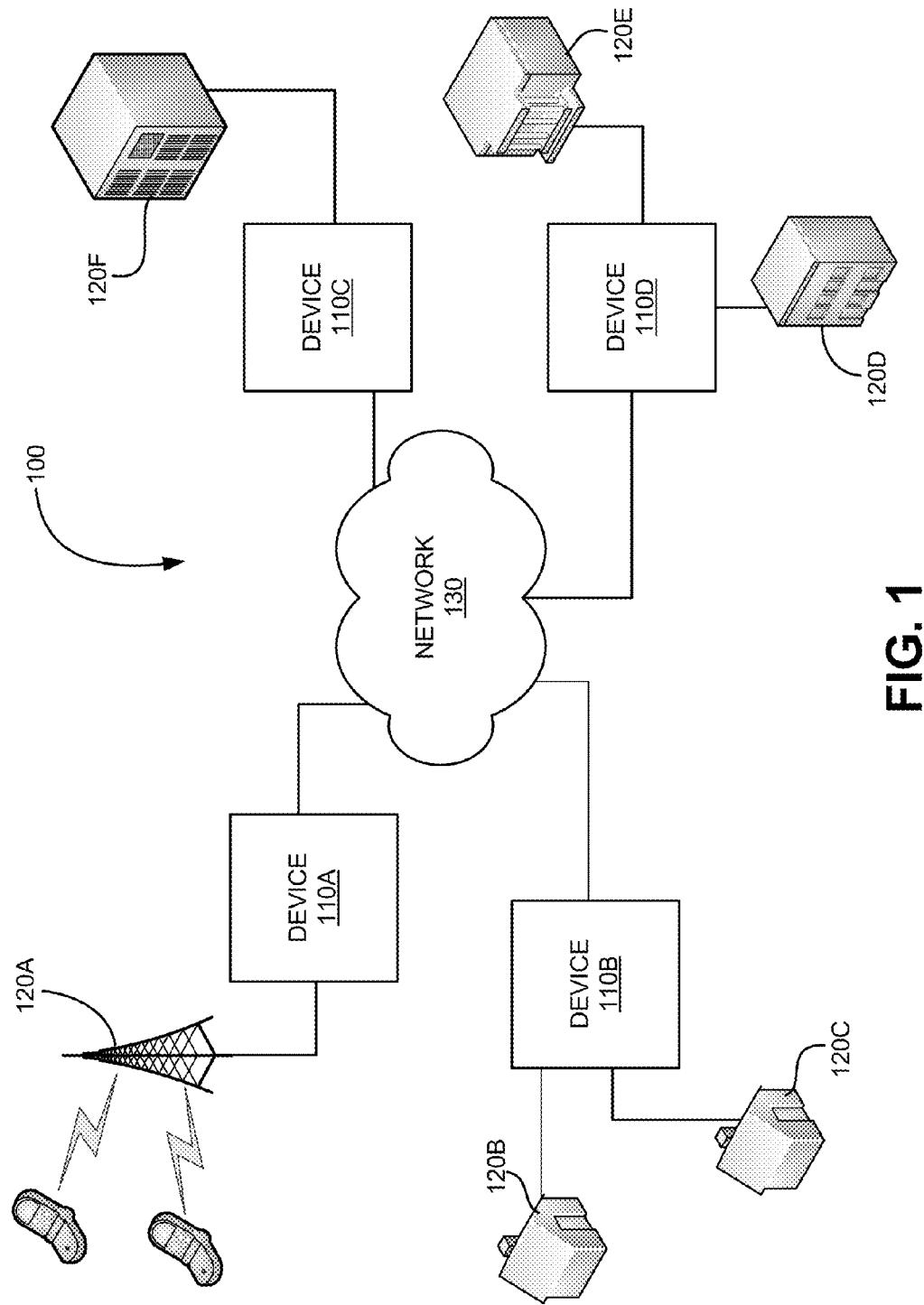
FIG. 1 depicts an exemplary network in which systems and methods described herein may be implemented.

FIG. 1 depicts an exemplary network 100 in which systems and methods described herein may be implemented. Network 100 may include network devices 110A to 110D (collectively "network devices 110" and individually "network device 110") connected to multiple end point devices 120A to 120F (collectively "end point devices 120" and individually "end point device 120") via a network 130. End point devices 120 may, in turn, be connected to customer equipment devices (not individually shown in FIG. 1). In some implementations, end point devices 120 may include servers, cellular telephone tower equipment (e.g., mobile switching offices), customer premises equipment, etc.) Although only four network devices 110 and six end point devices 120 have been illustrated as connected to network 130 for simplicity, in practice, there may be more or fewer connected devices. Also, in some instances, a particular network device 110 or end point device 120 may perform the functions of multiple network devices 110 and end point devices 120, respectively, or a network device 110 may perform the functions of an end point device 120 and vice versa.

As described in additional detail below, network 130 may include a carrier network, such as an Ethernet carrier network. In one implementation, network 130 may be configured as a metropolitan Ethernet network connecting physically diverse sites. Unlike traditional metro networks, which may use transport mechanisms such as asynchronous transfer mode (ATM), frame relay, or synchronous optical network (SONET), in an exemplary implementation, network 130 may be configured to utilize Ethernet as its layer two transport mechanism. As described briefly above, the use of Ethernet as a metropolitan level transport mechanisms has grown increasingly in recent years due to its relative cost and scalability with respect to alternative transport mechanisms implementations. Network 130 may also include a local area network (LAN), a wide area network (WAN), a telephone network, such as the Public Switched Telephone Network (PSTN), an intranet, an Internet Protocol-based network, such as the Internet, a session initiation protocol (SIP)-based network, a VoIP-based network, an IVR (interactive voice response)-based network, or a combination of networks. Network devices 110 may connect to network 130 via wired, wireless, and/or optical (e.g., fiber optic) connections.

Network devices 110 may include switching entities configured to support traffic across network 130. More specifically, consistent with Ethernet carrier network implementations, each network device 110 may be configured to support one or more configured Ethernet virtual connections (EVCs) thereon. An EVC may be generally considered to be a provisioned virtual connection between end point devices 120, such as between a cellular transmission facility (cell tower) (e.g., end point device 120A) and a mobile switching office (MSO) (e.g., end point device 120F (e.g., wireless Ethernet back hauling (WEBH) network). In an exemplary implementation, there may be three categories of EVCs: point-to-point (E-Line), multipoint-to-multipoint (E-LAN), and rooted-multipoint (E-Tree). E-Line services are similar to traditional TDM (time division multiplexed) leased line circuits and provide connectivity between user-to-network interfaces (UNIs). An E-LAN service may be used for connecting multiple UNIs in a LAN-like fashion. The E-Tree service restricts the communication between UNIs offered by E-LAN services. E-Tree UNIs are categorized as either roots or leaves, with the basic connectivity principle being that roots can send and receive frames from other roots and all leaves, whereas leaves are limited to sending and receiving frames to and from roots only. In some implementations, EVCs may be virtual local area networks (VLANs).

Consistent with embodiments described herein, network devices 110 may include switches, routers, hubs, bridges, etc., configured to support Ethernet carrier network functions. Although not illustrated in FIG. 1, network 130 may include multiple networks, operated by different service providers. In such an implementation, network 130 may include a number of internal network devices 110 (e.g., routers, switches, etc.) connected via network-to-network interfaces (NNIs). Each NNI in network 130 may support Ethernet carrier network functionalities and EVCs provisioned thereon.

End point devices 120 may be connected to network devices 110 via UNIs. Examples of end point devices 120 may include cellular transmission facilities, MSOs, cable television (CATV) head ends, voice telephony gateways, customer network interface devices (NIDs), etc. For example, each of end point devices 120 may represent user equipment, such as customer premises equipment (CPE), customer edge (CE) devices, switches, routers, computers or other devices coupled to network devices 110. End point devices 120 may connect to network devices 110 via wired, wireless or optical communication mechanisms. For example, end point devices 120 may connect to network devices 110 via a layer 2 network (e.g., an Ethernet network), point-to-point links, the public switched telephone network (PSTN), a wireless network, the Internet, or some other mechanism.

Figure 2:
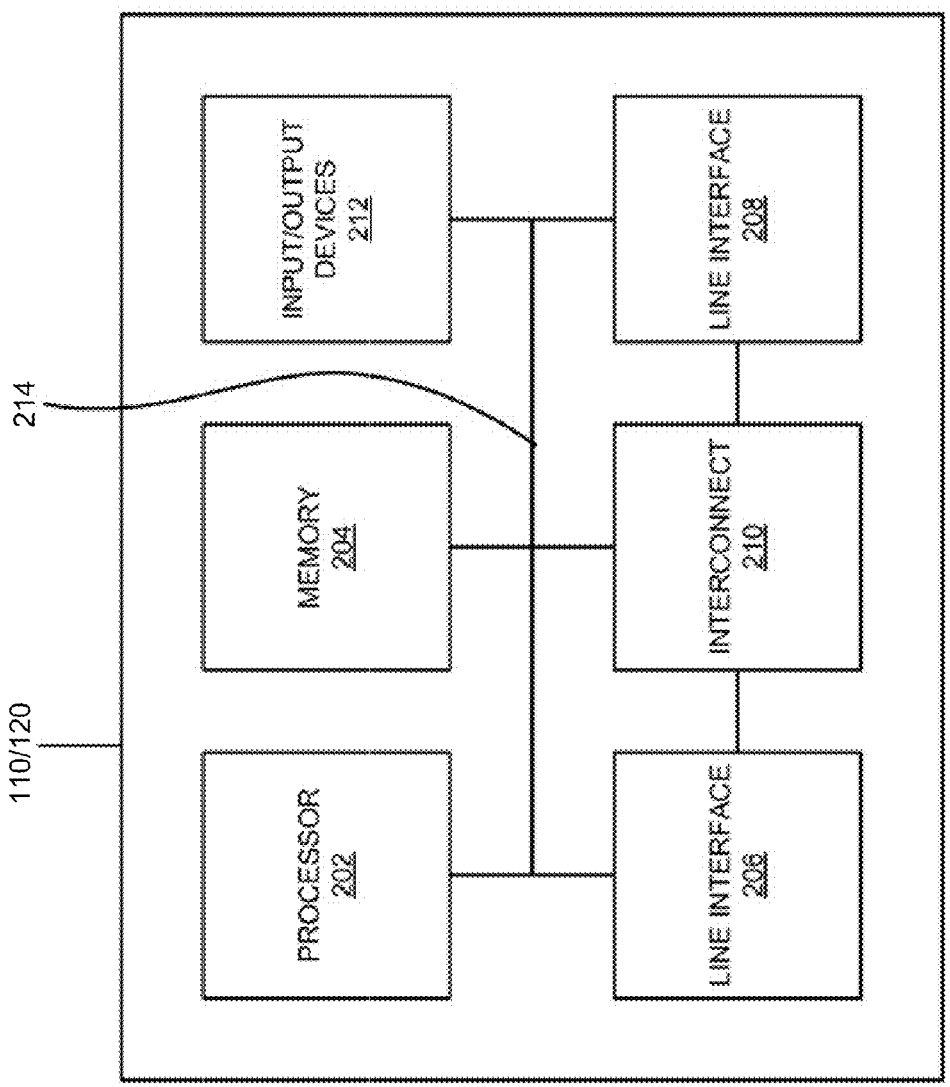
FIG. 2 depicts an exemplary network device configured to communicate via the exemplary network illustrated in FIG. 1.

FIG. 2 is an exemplary diagram of a network device 110 or end point device 120 (hereinafter called "device 110/120"), which may correspond to one or more of network devices 110 and/or end point devices 120. Each of devices 110/120 may include a processor 202, a memory 204, line interfaces 206 and 208, an interconnect 210, input/output devices 212, and a bus 214.

Processor 202 may include one or more processors, microprocessors, application specific integrated circuits (ASICs), field programmable gate arrays (FPGAs), and/or processing logic optimized for networking and communications. Processor 202 may process packets, frames, or and/or network path-related information. Memory 204 may include static memory, such as read only memory (ROM), dynamic memory, such as random access memory (RAM), and/or onboard cache, for storing data and machine-readable instructions. Memory 204 may also include storage devices, such as a floppy disk, a CD ROM, a CD read/write (R/W) disc, and/or flash memory, as well as other types of storage devices. Line interfaces 206 and 208 may include devices for receiving incoming data from networks and for transmitting packets to networks. Interconnect 210 may include switches or other logic for conveying an incoming packet from line interface 206 to line interface 208 based on a packet destination and stored path information. Examples of interconnect 210 may include a communication bus or a switch fabric. Input/output devices 212 may include a display console, keyboard, mouse, and/or other types of devices for converting physical events or phenomena to and/or from digital signals that pertain to devices 110/120. Input/output devices 212 may allow a user or a network administrator to interact with devices 110/120 (e.g., configure devices 110/120). Bus 214 may include a path that permits communication among components of each of devices 110/120.

As will be described in detail below, devices 110/120 may support a carrier Ethernet network having improved data loss characteristics, such as a lower frame loss ratio (FLR). FLR is defined as a ratio or frames successfully delivered to frames attempted at a given committed information rate (CIR). Conventional carrier Ethernet networks typically guarantee frame loss ratios (FLR) of approximately $10^{-4}$ to $10^{-5}$. That is, at least 9,999 of every 10,000 attempted frames are successfully delivered. Although this ratio is acceptable for most applications, some services, such as Ethernet back haul (EBH) services require FLRs on the order of $10^{-6}$ or $10^{-7}$ (i.e., approximately one frame lost per every one million to ten million frames attempted).

Devices 110/120 may be configured to establish active and backup EVCs therebetween for providing linear protection in a manner consistent with International Telecommunication Union—Telecom (ITU-T) standard G.8031. Under ITU-T G.8031, traffic transmitted over the active EVC may be switched to the backup EVC in the event of a failure. Consistent with implementations described herein, devices 110/120 may be configured to duplicate and transmit packet flows simultaneously on both the active EVC and the backup EVC.

Upon receipt of the transmitted packets, the receiving device 110/120 may be configured to compare the data loss characteristics of each received packet flow. For example, the FLR of each packet flow may be determined. The receiving device 110/120 may forward the packets from the packet flow exhibiting the better data loss characteristic.

Devices 110/120 may perform these operations in response to processor 202 executing software instructions contained in a computer-readable medium, such as memory 204. A computer-readable medium may be defined as a physical or logical memory device.

The software instructions may be read into memory 204 from another computer-readable medium, such as a data storage device, or from another device via line interfaces 206 and/or 208. The software instructions contained in memory 204 may cause processor 202 to perform processes that will be described later. Alternatively, hardwired circuitry may be used in place of or in combination with software instructions to implement processes described herein. Thus, implementations described herein are not limited to any specific combination of hardware circuitry and software.

Figure 3:
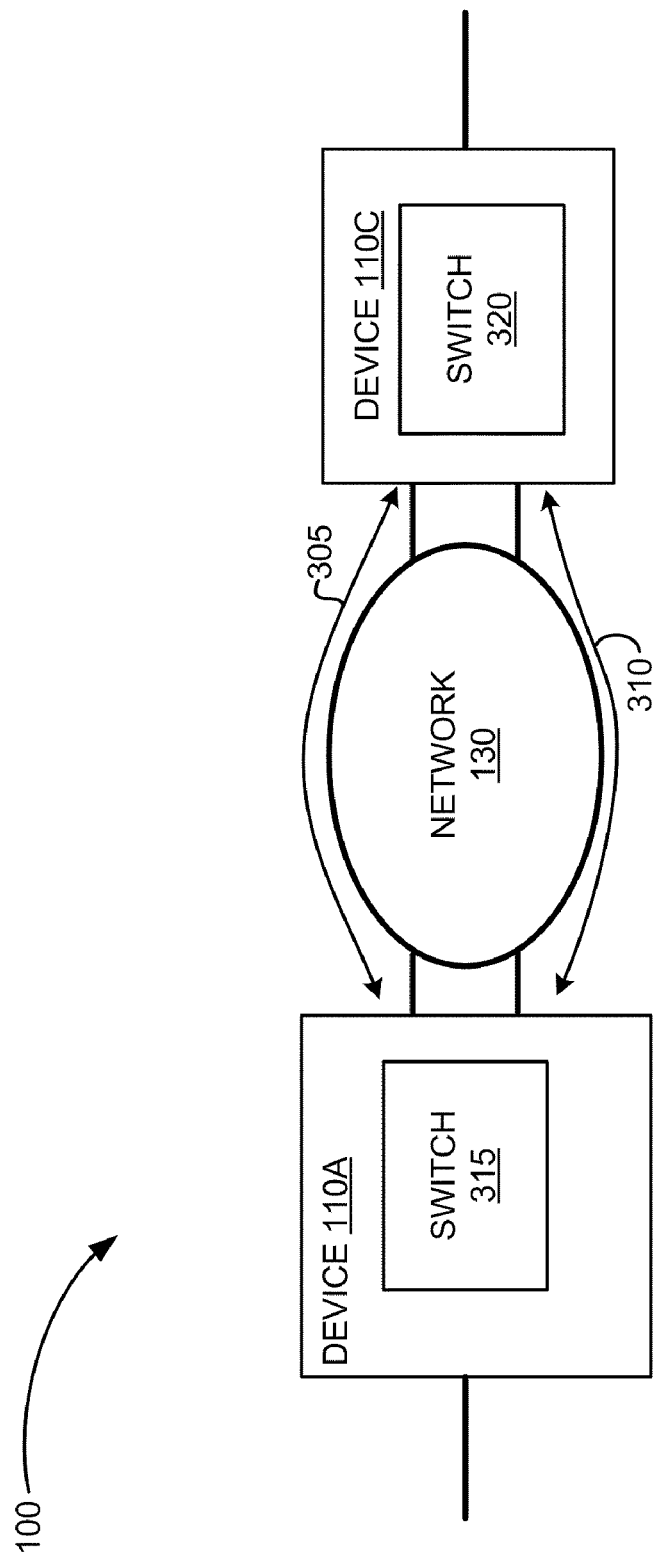
FIG. 3 is a block diagram of an exemplary portion of the network of FIG. 1.

FIG. 3 is a block diagram of a portion of network 100 in which systems and methods described herein may be implemented. As illustrated, a portion of network 100 may include near end network device 110A and a far end network device 110C connected via EVC 305 and EVC 310, respectively, within network 130. Implementation of carrier Ethernet networks typically requires provisioning of the EVCs through the network. This provisioning may be accomplished in a variety of manners including spanning tree protocol (STP), rapid STP (RSTP), manual provisioning, or media access control (MAC)-in-MAC provisioning. However, in STP-based networks, exceptionally low data loss characteristics (e.g., low FLRs) are traditionally difficult to obtain and require careful circuit engineering and precise network monitoring equipment. Competing layer 2 technologies typically allow much lower FLRs than conventional carrier Ethernet implementations.

Consistent with implementations described herein, a switching device 315 on near end network device 110A and a switching device 320 on far end network device 110C may be configured to transmit/receive duplicate packet flows across EVCs 305/310. In order to facilitate a packet-by-packet comparison between the two flows, an upstream or sending switching device 315/320 may be configured to append or insert a sequence number into a layer 2 packet header for each packet transmitted. For example, assuming that near end network device 110A is the sending device, switching device 315 may rewrite the layer 2 header of each packet in the transmitted packet flows to include sequential sequence numbers. In one exemplary implementation, the layer 2 header of each packet may include a 16-bit sequence number field.

In one embodiment, switching device 315 may determine whether a packet is a first packet in a flow and may adjust the sequence numbering accordingly. For example, a packet flow may be identified based on upstream device addressing information, source addressing information (e.g., IP address, port identification, etc.), destination addressing information, protocol information, or some combination thereof. When switching device 315 recognizes a new packet flow, switching device 315 may initialize the sequence numbering. Otherwise, each packet in the transmitted flows on EVCs 305 and 310 may be sequentially numbered based on the previously forwarded packet sequence number.

Numbering of the packets in the flows may facilitate compensation of differential delay introduced between the packet flow through EVC 305 and the packet flow through EVC 310, given that EVC 305 and EVC 310 may traverse different physical paths. Upon differential delay compensation, a packet-by-packet comparison of the packet flows over EVC 305 and EVC 310 may be made.

For a given sampling interval, the receiving switching device (e.g., switching device 320) may identify packet losses for the packet flows received via EVC 305 and EVC 310. For example, switching device 320 on far end network device 110C may identify a maximum sequence number window corresponding to flows received via EVC 305 and EVC 310 and may determine packet losses with the maximum sequence number window for each flow. The better performing EVC may be identified based on the determined packet losses for each flow. For example, assume that receiving switching device 320 begins analyzing packet losses for packet flows received via both EVC 305 and EVC 310 having a sequence window of sequence number 1258 to sequence number 11258 (e.g., a window of 10000 packets). For this sequence number window, receiving switching device 320 may determine a number of packets lost via EVC 305 and a number of packets lost via EVC 310. Receiving switching device 320 may determine the better performing of the two EVCs based on this determination.

In one exemplary implementation, the packet loss determination may be performed by examining each received packet received via EVCs 305/310. For example, a received Ethernet frame may be de-encapsulated to extract the packet(s) included therein. The layer 2 (L2) header may be extracted from each packet and the sequence number may be retrieved from the extracted header. Receiving switching device 320 may maintain a table or listing of received sequence numbers for each flow and may identify the EVC having the lowest number of lost or missing packets at the conclusion of the sampling window.

Once the better performing EVC 305/310 is determined, receiving switching device 320 may forward the packet flow corresponding to the higher performing EVC 305/310 on to downstream network devices. In one implementation, the sequence number information in the L2 header may be removed prior to forwarding. Although described above in relation to switching device 315 on near end network device 110A sending a packet flow to switching device 320 on far end network device 110C, it should be understood that the above described functionality may be performed by any pair of network devices in network 100, thereby supporting bidirectional traffic flow across network 130.

In addition to providing enhanced network performance, the implementations described above also provide for efficient EVC seamless switchover in the event of a failure of either EVC 305 or EVC 310. More specifically, because all traffic is already being transmitted across both EVC 305 and EVC 310, and a higher performing EVC is selected in the manner described above, a failed, non-operational, or drastically underperforming EVC may be avoided as the poorer performing EVC, when compared to the operational EVC. In one exemplary embodiment, switchover from a failed EVC to the backup EVC may be accomplished in less than 50 milliseconds (ms). In some implementations, the receiving network device may include failure detection mechanisms for determining whether an EVC has failed. For example, the receiving network device may determine whether a data rate associated with an EVC has dropped below a predetermined threshold in the absence of an end of flow indication.

In other implementations consistent with embodiments described herein, a receiving network device (e.g., far end network device 110C) may store or queue received packets prior to downstream forwarding. Upon identification of missing or lost packets from one flow (e.g., via EVC 305), the network device may identify packets in the other flow that correspond to the lost or dropped packets. The network device may then insert the identified packets into the flow prior to forwarding.

FIG. 4 is a flow diagram illustrating exemplary processing associated with providing high performance service in network 100. Processing may begin with the provisioning of a first EVC and a second EVC between a near end network device and a far end network device (block 400). For example, EVCs 305 and 310 may be provisioned between near end network device 110A and far end network device 110C. In one implementation, the first and second EVC may traverse different physical paths. In one implementation, one EVC 305/310 may be provisioned as an active EVC and the other EVC 305/310 may be provisioned as a backup EVC.

A first switch on the near end network device may be configured to receive and duplicate a flow of packets (block 405). For example, switching device 315 may be configured to receive a packet flow from an upstream device (not shown in FIG. 3). Switching device 315 may replicate or otherwise duplicate the receive packet flow. The first switch may be configured to append/insert a sequence number on each packet in the duplicated packet flows (block 410). For example, as described above, switching device 315 may be configured to identify a start of a packet flow, initialize a sequence number for the flow, and add sequential sequence numbers to a header of each packet in the packet flows. In one exemplary implementation, the sequence number may be added to a Layer 2 header of each packet in the packet flows. Furthermore, in some implementations, the sequence number is added prior to packet duplication, while in other implementations, the sequence number is added following duplication.

A first switch, e.g., switching device 315, may be configured to transmit the duplicated packet flows on both the first EVC and the second EVC (block 415). A second switch, e.g., switching device 320, on the far end network device may be configured to receive the packet flows on both the first EVC and the second EVC (block 420). For example, switching device 320 may be configured to receive packet flows on EVCs 305 and 310.

The second switch may be configured to compare the packet flows to each other in view of a defined performance characteristic (block 425). For example, switching device 320 may be configured to identify missing or damaged packets in each of the received packet flows. In one implementation, switching device 320 may perform a packet-by-packet comparison of received packets based on the sequence numbers added by switching device 315. As described above, adding sequence numbers to transmitted packets on both packet flows may enable switching device 320 to accurately determine which packets have been received and which packets have been not been received for a defined sequence number window. Furthermore, the packet sequence numbers may allow received packets sharing a common sequence number to be compared to determine whether packet errors have occurred.

The second switch may identify a higher performing packet flow based on the performance comparison (block 430). For example, switching device 320 may determine whether a packet loss rate and/or packet error rate associated with the packet flow received via EVC 305 is greater than a packet loss rate and/or packet error rate associated with the packet flow received via EVC 310. If so, the packet flow received via EVC 310 may be considered to be the higher or better performing packet flow, otherwise the packet flow received via EVC 305 may be considered to be the higher performing packet flow.

The second switch may forward the higher or better performing packet flow to downstream devices (block 435). In one implementation, second switching device 320 may remove sequence number information appended or added by first switching device 315 prior to forwarding. Processing may then return to block 425 for a next sampling interval or sequence number window.

As described above, some conventional Carrier Ethernet implementations may be configured in a manner consistent with ITU-T G.8031, in which active and backup EVCs are established between network endpoints to allow for automatic protection switching in the event of a failure. Consistent with implementations described herein, the redundant EVCs configured between network devices may be leveraged to enable a higher performance network. More specifically, by duplicating and transmitting data flow simultaneously across both the active and backup EVCs, a downstream device may be configured to monitor performance on both EVCs and forward data from the EVC exhibiting higher performance characteristics. In some implementations, sequence numbers or other differential delay compensation techniques may be used to compensate for out-of-order or delayed traffic transmissions.

The foregoing description provides illustration and description, but is not intended to be exhaustive or to limit the embodiments to the precise form disclosed. Modifications and variations are possible in light of the above teachings or may be acquired from practice of the invention.

For example, while series of blocks have been described with regard to the flowchart of FIG. 4, the order of the acts may differ in other implementations. Further, non-dependent acts may be performed in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic", a "function," or a "component" that performs one or more functions. Such logic or functions may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   provisioning a first virtual connection between a first device and a second device;
   provisioning a second virtual connection between the first device and the second device;
   receiving a data flow at the first device;
   duplicating the data flow to generated duplicated data flows;
   transmitting the duplicated data flows to the second device via the first virtual connection and the second virtual connection;
   receiving the duplicated data flows at the second device via the first virtual connection and the second virtual connection;
   determining a performance characteristic of the data flow received via the first virtual connection;
   determining the performance characteristic of the data flow received via the second virtual connection;
   selecting, for forwarding, the data flow received via the first virtual connection or the data flow received via the second virtual connection based on the performance characteristics of the data flow received via the first virtual connection and the performance characteristic of the data flow received via the second virtual connection; and
   forwarding the selected data flow.

2. The method of claim 1, wherein the first virtual connection and the second virtual connection comprise Ethernet virtual connections (EVCs).

3. The method of claim 2, wherein the first virtual connection comprises an active EVC and the second virtual connection comprises a backup EVC configured to provide automated backup protection for the active EVC.

4. The method of claim 1, further comprising:
   compensating for differential delay associated with data received via the first virtual connection and the second virtual connection.

5. The method of claim 1, wherein the data flow comprises a packet flow having a plurality of packets therein.

6. The method of claim 5, wherein the performance characteristic comprises a packet loss characteristic or a packet error characteristic.

7. The method of claim 5, wherein selecting the data flow received via the first virtual connection or the data flow received via the second virtual connection based on the performance characteristics of the data flow received via the first virtual connection and the performance characteristic of the data flow received via the second virtual connection, further comprises comparing the plurality of packets received via the first virtual connection with the plurality of packets received via the second virtual connection.

8. The method of claim 7, further comprising:
   inserting a sequence number into each packet in the packet flow, wherein the sequence numbers comprise incremented numbers representative of an order of packets within the packet flow,
   wherein comparing the plurality of packets received via the first virtual connection with the plurality of packets received via the second virtual connection is performed based on their respective sequence numbers.

9. The method of claim 8, further comprising:
   identifying packets in the non-selected packet flow that correspond to identified missing or damaged packets in the selected packet flow; and inserting the identified packets into the selected packet flow prior to forwarding the selected packet flow.

10. A system, comprising:
a first network device;
a second network device coupled to the first network device via a first virtual connection and a second virtual connection,
wherein the first network device comprises:
   a first switching device configured to output a first data flow for transmission via the first virtual connection and a second data flow for transmission via the second virtual connection, wherein the first data flow is substantially identical to the second data flow,
   wherein the first switching device is configured to transmit the first data flow and the second data flow to the second device via the first and second virtual connections, respectively;
wherein the second network device comprises:
   a second switching device configured to receive the first data flow and the second data flow via the first virtual connection and the second virtual connection, respectively,
   wherein the second switching device is configured to determine a performance characteristic of the first data flow and a performance characteristic of the second data flow,
   wherein the second switching device is configured to select, for forwarding, the first data flow or the second data flow based on a comparison of the performance characteristics of the first data flow and the second data flow, and
   wherein the second switching device is configured to forward the selected data flow.

11. The system of claim 10, wherein the first virtual connection and the second virtual connection comprise Ethernet virtual connections (EVCs).

12. The system of claim 10, wherein the second switching device is further configured to compensate for differential delay associated with data received via the first virtual connection and the second virtual connection.

13. The system of claim 10, wherein the first data flow and the second data flow comprise first and second packet flows having a plurality of packets.

14. The system of claim 13, wherein the performance characteristic comprises at least one of a packet loss characteristic or a packet error characteristic, and
   wherein the second switching device is configured to select, the first packet flow or the second packet flow based on the at least one of the packet loss characteristic or the packet error characteristic of the first packet flow and the second packet flow.

15. The system of claim 13, wherein the second switching device is further configured to compare the plurality of packets received via the first virtual connection with the plurality of packets received via the second virtual connection on a packet-by-packet basis.

16. The system of claim 15, wherein the first switching device is further configured to insert a sequence number into packets in the first and second packet flows, wherein the sequence numbers comprise incremented numbers representative of an order of packets within the first and second packet flows, respectively, and
   wherein the second switching device is further configured to compare the plurality of packets received via the first virtual connection with the plurality of packets received via the second virtual connection based on their respective sequence numbers.

17. The system of claim 16, wherein the first switching device is further configured to insert the sequence numbers into respective headers of each packet in the first and second packet flows.

18. A method, comprising:
   provisioning a first virtual connection between a first network device and a second network device;
   provisioning a second virtual connection between the first network device and the second network device,
   wherein the first virtual connection and the second virtual connection comprise different physical paths;
   duplicating a received packet flow to generate a first packet flow and a second packet flow;
   transmitting the first packet flow to the second network device via the first virtual connection;
   transmitting the second packet flow to the second network device via the second virtual connection;
   comparing, at the second network device, packets received via the first virtual connection with packets received via the second virtual connection;
   selecting the first packet flow or the second packet flow based on the comparing; and
   forwarding the selected packet flow.

19. The method of claim 18, further comprising:
   identifying a failure of the first virtual connection or the second virtual connection;
   selecting, for forwarding, the packet flow transmitted via the other of the first virtual connection or the second virtual connection; and
   forwarding the selected packet flow.

20. The method of claim 19, wherein the selecting and forwarding of the selected packet flow is performed in less than 50 milliseconds.

* * * * *